(12) United States Patent
Lection et al.

(10) Patent No.: US 6,271,843 B1
(45) Date of Patent: Aug. 7, 2001

(54) METHODS SYSTEMS AND COMPUTER PROGRAM PRODUCTS FOR TRANSPORTING USERS IN THREE DIMENSIONAL VIRTUAL REALITY WORLDS USING TRANSPORTATION VEHICLES

(75) Inventors: David Bruce Lection, Raleigh, NC (US); Abbott Purdy Brush, II, Woodbridge, CT (US); David Allen Schell, Durham; Kevin Baker Sizer, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/866,826

(22) Filed: May 30, 1997

(51) Int. Cl.[7] .................................................. G06T 15/70
(52) U.S. Cl. ............................ 345/355; 345/329; 434/62; 434/69
(58) Field of Search ..................................... 345/419, 427, 345/423, 355, 327, 326; 434/62, 69; 463/32

(56) References Cited

U.S. PATENT DOCUMENTS

| | | | |
|---|---|---|---|
| 4,879,849 | * 11/1989 | Hollingworth, III et al. | 52/10 |
| 4,895,376 | * 1/1990 | Shiung-fei | 345/473 |
| 5,333,272 | 7/1994 | Capek et al. | 395/275 |
| 5,498,003 | * 3/1996 | Gechter | 463/31 |
| 5,522,018 | * 5/1996 | Takeda et al. | 345/422 |
| 5,555,354 | * 9/1996 | Strasnick | 345/355 |
| 5,633,993 | * 5/1997 | Redmann | 345/419 |
| 5,662,523 | * 9/1997 | Yasumaru et al. | 463/32 |
| 5,680,524 | * 10/1997 | Maples et al. | 345/427 |
| 5,702,307 | * 12/1997 | Moran | 472/47 |
| 5,734,805 | * 3/1998 | Isenee et al. | 345/355 |
| 5,736,982 | * 4/1998 | Suzuki et al. | 345/355 |
| 5,737,619 | 4/1998 | Judson | 709/218 |
| 5,764,912 | 6/1998 | Rosborough | 709/224 |
| 5,850,225 | * 12/1998 | Cosman | 345/427 |
| 5,854,897 | 12/1998 | Radziewicz et al. | 709/224 |
| 5,862,337 | 1/1999 | Gray | 709/224 |
| 5,919,045 | * 7/1999 | Tagge et al. | 434/62 |
| 5,978,841 | * 11/1999 | Berger et al. | 709/217 |
| 5,990,896 | * 11/1999 | Barrus | 345/420 |
| 6,003,065 | * 12/1999 | Yan et al. | 709/201 |

OTHER PUBLICATIONS

W.I. Clement, "An Instructional robotics and machine Vision Laboratory," IEEE Transactions on Education, pp. 87–90, 1994.*

Cheong, Fah–Chun, World Wide Web: Playground for Robots, Web Proxies, *Internet Agents: Spiders, Wanderers, Brokers, and Bots*, Ch. 3, p. 67, (New Riders 1996).

http://www.news.com.SpecialFeatrues/Continued/0,6,4804 4,00.html, "Billboards on the Infobahn," pp. 1–2, May 23, 1997.

Kohda, Youji, et al., Ubiquitous advertising on the WWW. Merging advertisement on the browser, *Computer Networks and IDSN Systems*, 28, pp. 1493–1499 (1996).

* cited by examiner

Primary Examiner—Raymond J. Bayerl
Assistant Examiner—Thomas J. Joseph
(74) Attorney, Agent, or Firm—Myers Bigel Sibley & Sajovec

(57) ABSTRACT

Methods, systems and computer program products are provided which transport a user in a virtual reality environment from a first location to a second location by providing a transportation vehicle that receives the user at the first location, receiving a destination signal from the user which indicates the second location as a destination, transporting the user in the transportation vehicle to the second location independent of any user input, and providing customized information to the user when the user is in the transportation vehicle. The transportation may be inter-world or intra-world. The customized information can take any number of forms such as dynamic visual scenery, audio messages, static visual graphics, video images, or any combination thereof.

41 Claims, 7 Drawing Sheets

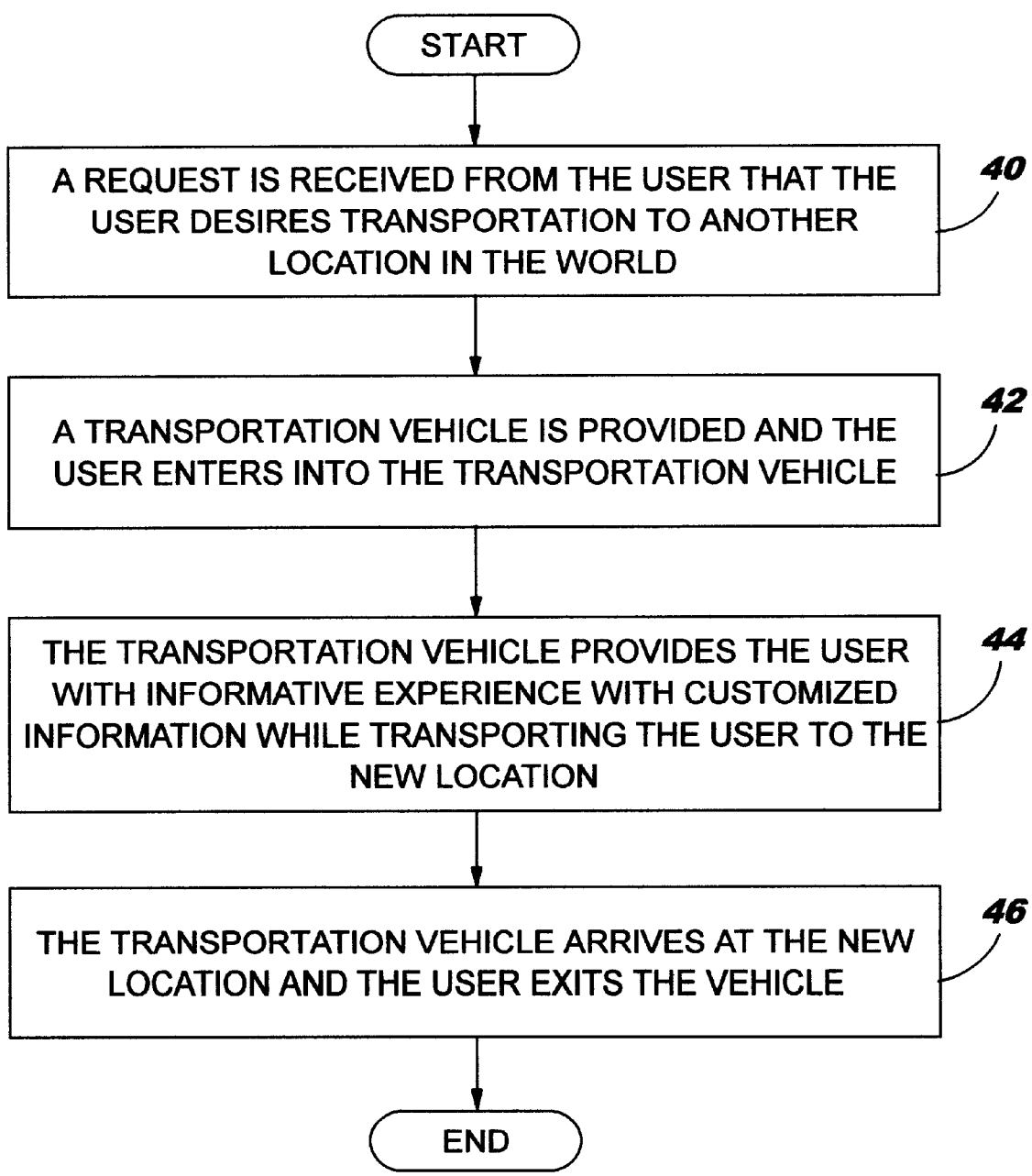

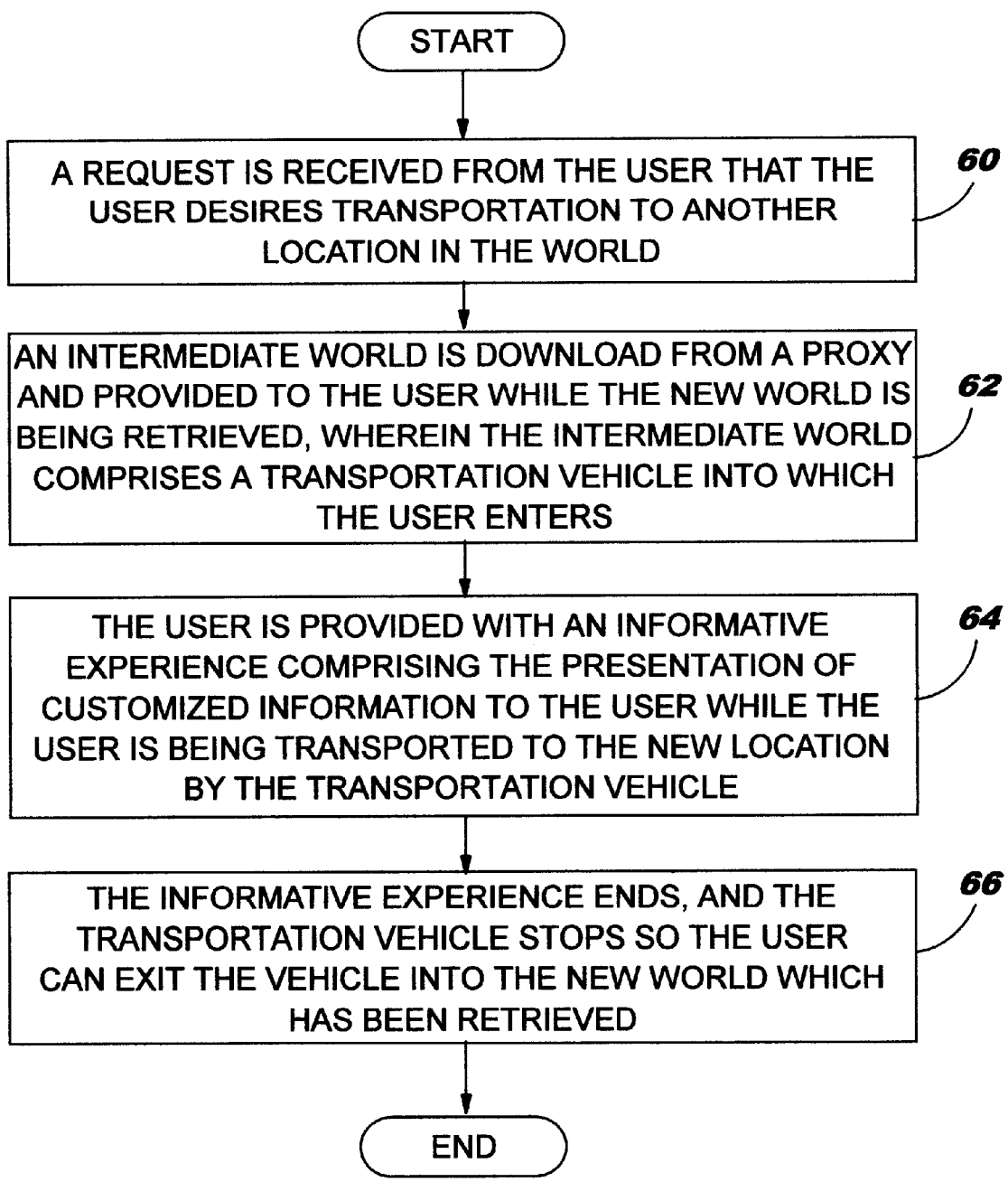

METHODS SYSTEMS AND COMPUTER PROGRAM PRODUCTS FOR TRANSPORTING USERS IN THREE DIMENSIONAL VIRTUAL REALITY WORLDS USING TRANSPORTATION VEHICLES

RELATED APPLICATION

The present application is related to U.S. patent application Ser. No. 08/866,658, entitled "Methods, Systems and Computer Program Products for Providing Insertions During Delays In Interactive Systems," co-filed with the present application on May 30, 1997, and commonly assigned.

FIELD OF THE INVENTION

The present invention generally relates to three dimensional virtual worlds, and more particularly, to transporting users in three dimensional virtual reality worlds.

BACKGROUND OF THE INVENTION

The Internet is a decentralized network of computers that can communicate with one another via the TCP/IP (transmission control protocol/Internet protocol) network protocol. Although the Internet has its origins in an agency started by the United States Department of Defense in the late 1960's called the U.S. Advanced Research Project Agency (ARPANET), it has only recently become a worldwide communication medium. The explosive growth in use and traffic over the Internet may be due, at least in part, to the development in the early 1990's of the World Wide Web (WWW), which is one of several service facilities provided on top of the Internet. Other facilities include a variety of communication services such as electronic mail (e-mail), telnet, usenet newsgroups, Internet relay chat (IRC), a variety of information search services such as WAIS and Archie, and a variety of information retrieval services such as FTP (file transfer protocol) and Gopher. While these facilities have serviced the research-oriented user well, most agree that it is the multimedia capability of the WWW which may have brought the Internet into such prominence.

As illustrated in FIG. 1, the WWW is a client-server based facility that comprises a number of servers 12 (e.g., computers connected to the Internet) on which web pages or files reside and clients 14 (e.g., web browsers) which interface the users with the web pages. A web browser is a software application such as WebExplorer® (IBM Corporation) or Netscape Navigator® (Netscape Communication Corporation) that operates on a client 14 and that typically sends a request over the Internet to a server 12 requesting a copy of a web page identified by a uniform resource locator (URL) which denotes both the server where the web page resides and the file or files which comprise the web page. In response, the server 12 sends a copy of the requested file(s) to the web browser which displays the web page to the user.

Web pages on the WWW may be hyper-media documents written in a standardized language called hypertext markup language (HTML). A typical web page includes text together with embedded formatting commands, referred to as tags, which can be used to control the font size, the font style (for example, whether italic or bold), the layout of the text or other document attributes. A web browser parses the HTML script in order to display the text in accordance with the specified format. In addition, a web page can also contain a reference, in terms of another URL, to a piece of multimedia data, for example, an image, a video segment, or an audio file. The web browser responds to such a reference by retrieving and displaying or playing the data. This often requires the web browser to launch another software application such as a plug-in or helper program that is particularly configured for displaying or playing the multimedia data as formatted. Alternatively, such multimedia data may form its own web page, without any surrounding HTML text.

Some web pages also contain one or more references to other web pages which need not be on the same server as the original web page. Such references may generally be activated by the user selecting particular locations on the screen, typically by clicking a primary button of a pointing device such as a mouse. These references or locations are known as hyperlinks, and are typically flagged by the browser in a particular manner (for example, any text associated with a hyperlink may be in a different color or underlined). If the user selects the hyperlink, then the referenced page is retrieved and replaces the currently displayed page. Further information about HTML and the WWW can be found in *World Wide Web and HTML* by Douglas MacArthur, pp. 18–26 and *Dr. Dobbs'Journal,* December 1994, and in *The HTML Sourcebook* by Ian Graham, John Wiley Publishers, New York (1995).

Out of an effort to heighten the sensory experience of the WWW, three dimensional virtual reality languages began to be developed. One such language is the virtual reality modeling language (VRML, pronounced "ver-mel"). VRML is a standardized language for describing the animation and three dimensional modeling of geometric objects. VRML allows a three dimensional scene(s) or world(s) to be manipulated in an interactive manner over the Internet and shared by multiple users. Virtual reality worlds are generally defined with reference to an x-axis, a y-axis, and a z-axis so as to allow movement with six degrees of freedom. Thus, unlike HTML which provides for merely formatting text and images, and for hyperlinks to other web pages, VRML provides for the organization and interaction of three dimensional objects and scenes in a hierarchical fashion within a virtual three dimensional space.

A VRML browser is used to view a three dimensional virtual world constructed using VRML. The VRML browser may be a helper program or plug-in to a web browser that is launched when the web browser detects that a file being downloaded is a VRML document. The VRML browser provides means for allowing the user to move around or navigate the three dimensional virtual world. Typical navigation controls for a VRML browser include walk, spin, look, slide, and point. Typically, the walk control allows the user to move forward and backward within a world, the spin control allows the user to turn in an arcuate fashion within a world, the look control allows the user to zoom in or pan out from a particular area within a world, the slide control allows the user to move sideways in an arcuate fashion within a world, and the point control allows the user to return to their initial vantage point within a world.

In addition to navigating through a VRML world, a VRML browser (i.e., the client) may share a world with one or more other VRML browsers. In this context, a user of a VRML browser may select a three dimensional representation of him/herself known as an "avatar" which is an object or group of objects. The user then navigates in the world with other avatars that represent other users of VRML browsers in that world (e.g., other clients). Thus, as a user's avatar moves through the world the user is able to see other users' avatars moving as well, and vice versa. The navigation controls utilized in conjunction with an avatar are typically the same as those described above.

The positions of the avatars within a VRML world are tracked by a matrix-based central object server. Thus, as the position or behavior of an avatar changes, the changes are detected by the central object server and rebroadcast out to the client web browsers. Current navigational controls typically allow for movement of the avatar with six degrees of freedom. Specifically, current navigational controls allow the user to traverse the world in the direction of the x, y, or z axis.

One problem which exists in three dimensional virtual worlds is that navigation between two locations within a three dimensional virtual world is typically provided via the metaphor of the user walking. While this metaphor may have some merit in certain circumstances, depending on the architecture of the virtual world and the user's intent in visiting the virtual world, the sizes of virtual worlds are generally increasing which may make walking between locations less desirable. For example, it may be undesirable for a user to walk from a first location to a second location within a virtual world if the two locations are relatively far apart because of the time required to move a relatively long distance, as measured in the three dimensional virtual world, via the walking metaphor. Moreover, the user is usually not provided with any value-added content or entertainment as he/she walks from the first location to the second location. Some worlds have offered navigation through the metaphor of riding a bicycle. While this may be an improvement over navigation by walking, the user is still driving the process and is not provided any value-added content during the experience. Thus, the user may gain nothing more than a more expedient traverse of the world.

Another problem that exists in three dimensional virtual worlds is that once a user requests a new world, the user has to wait for a new world to be downloaded and rendered before the user can begin navigating in the new world. The user is typically unable to interact with the VRML browser while the world is being downloaded, which can take a relatively long time with download transmission speeds at or below 56 kilobits/second (Kbps). Accordingly, the user receives no value-added content and is not entertained during the download period, which can lead to frustration and users terminating sessions because of the delays moving between worlds or within a world.

In view of the above discussion, improvements are needed in the navigation between virtual worlds and within virtual worlds.

SUMMARY OF THE INVENTION

In view of the above discussion, it is an object of the present invention to improve navigation in a virtual reality environment.

A further object of the present invention is to maintain user attention while the user is being transported between two virtual environment locations.

Yet another object of the present invention is to provide customized information to a user during periods when the user would otherwise be uninvolved with the virtual environment.

Yet another object of the present invention is to provide navigation within or between virtual worlds which does not require extensive user input.

These and other objects of the present invention are provided by methods, apparatuses and computer program products which transport a user in a virtual reality environment from a first location to a second location. A transportation vehicle is provided that receives the user at the first location. A destination signal is received from the user which indicates the second location as a destination. The user is then transported to the second location independent of any user input. Customized information also may then be provided to the user when the user is in the transportation vehicle. The transportation may be between a first location in a first virtual reality world and a second location in a second virtual reality world (referred to as inter-world transportation), or alternatively, between a first location in a first virtual reality world and a second location in the same virtual reality world (referred to as intra-world transportation). The customized information can take any number of forms such as dynamic visual scenery, audio messages, static visual graphics, video images, or any combination thereof.

By providing the user with an informative experience while the user is being transported between two locations, the user is entertained and will be more likely to travel to other locations within a virtual world or between virtual worlds. Moreover, the information is customized which enhances the likelihood that the user's attention will be maintained by the information provided. This is advantageous in circumstances where the information comprises advertisements that can generate revenue for the author or provider of the virtual world(s).

In an embodiment of the present invention where the user is being transported intra-world, the transportation vehicle is a sub-part of the world. In another embodiment of the present invention where the user is being transported inter-world, the transportation vehicle is an intermediate world comprising the transportation vehicle. The intermediate world may be downloaded with the first world or once the request for a new world has been issued. In addition, the intermediate world may be cached at a proxy and downloaded therefrom.

As will further be appreciated by those of skill in the art, the present invention may be embodied as a method, apparatus or computer program product.

BRIEF DESCRIPTION OF THE DRAWINGS

FIG. 4 is a flowchart depicting the operations carried out by the vehicle mechanism of FIG. 1 in accordance with a first embodiment of the present invention;

FIG. 6 is a flowchart depicting the operations carried out by the vehicle mechanism of FIG. 1 in accordance with a second embodiment of the present invention.

DETAILED DESCRIPTION OF THE INVENTION

I. Introduction

The present invention now will be described more fully hereafter with reference to the accompanying drawings, in which preferred embodiments of the invention are shown. This invention may, however, be embodied in many different forms and should not be construed as limited to the embodiments set forth herein; rather, these embodiments are provided so that this document will be thorough and complete, and will fully convey the scope of the invention to those skilled in the art. The elements of the drawings place emphasis upon clearly illustrating the principles of the present invention. In addition, like numerals refer to like elements throughout the several views.

The present invention provides for the transportation of a user in a three dimensional virtual environment between two locations utilizing a transportation vehicle. During the transportation of the user, the user is provided with customized information, such as advertisements. The transportation is essentially automatic and does not require the user to manually control or drive the navigation as is the case when navigating by walking or bicycling. The present invention provides for displaying customized information to the user through a computer system having a display device and user input devices such as illustrated in FIG. 2 and described below.

II. Design

Figure 1:
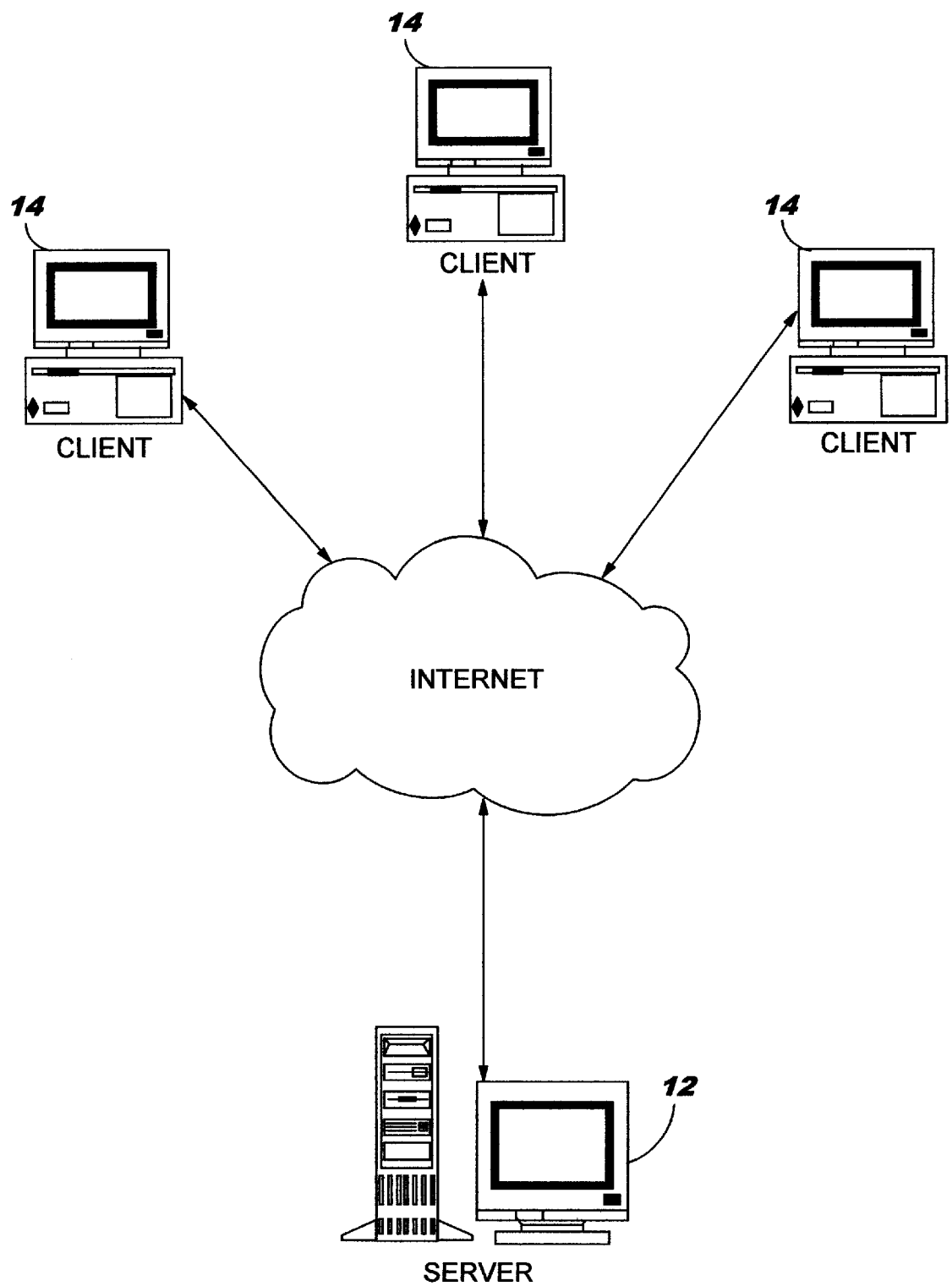
FIG. 1 is a schematic diagram illustrating an example of the interconnections comprising the World Wide Web (WWW) facility of the Internet.
Figure 2:
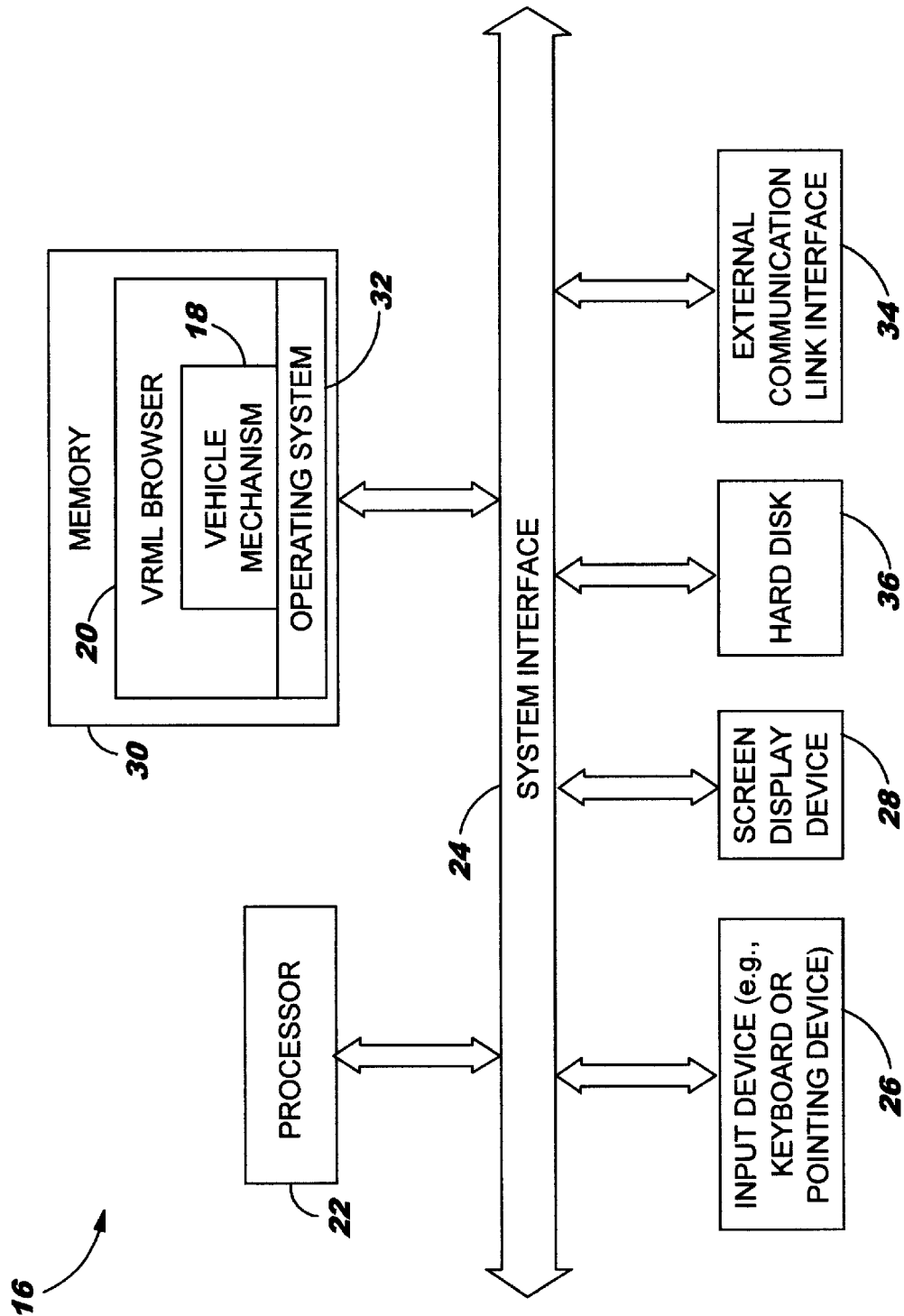
FIG. 2 is a block diagram illustrating a vehicle mechanism in accordance with the present invention situated within a computer-readable medium, for example, in the memory of a computer system.

FIG. 2 illustrates a computer system 16 which is suitable for implementing a client which includes a vehicle mechanism 18 in accordance with the present invention. The vehicle mechanism 18 may be implemented as a component of a three dimensional virtual reality browser such as a virtual reality modeling language (VRML) browser 20. The computer system 16 includes a processor 22 that communicates with the other elements within the computer system 16 via a system interface 24. An input device 26, for example, a keyboard or a pointing device, is used to input data from the user, and a screen display device 28, for example, a monitor, is used to output data to the user. A memory 30 within the computer system 16 includes the VRML browser 20 (and thus, the vehicle mechanism 18) and a conventional operating system 32 which communicates with the VRML browser 20 and enables execution of the VRML browser 20 (and thus, the vehicle mechanism 18) by the processor 22. An external communication link 34 is provided to interface the computer system 16 with other computer systems or computer-based machines such as in a local area network (LAN) or a wide area network (WAN), and/or for connecting to the Internet or an intranet. Lastly, a hard disk 36 may be provided as a persistent memory device, as is well known in the industry.

While the present invention is described herein with respect to VRML, as will be appreciated by one skilled in the art the present invention may be implemented in the context of a three dimensional virtual reality environment created using other virtual reality languages such as Java3D from Sun Microsystems, Inc., or Open Inventor from SGI, Inc.

The VRML browser 20 may be a standalone software application, a plug-in application or a helper application, all of which are well known in the art. As a standalone application, the VRML browser 20 has network communication capability so as to be able to form a TCP/IP communication link to the Internet. An example of a standalone software application that is commercially available is WebSpace® Navigator (Silicon Graphics, Inc.). As a plug-in application, the VRML browser 20 operates inside the window of a web browser such as Netscape Navigator® or Netscape Communicator™ (both from Netscape Communication Company). Examples of plug-in applications that are commercially available include Live3D (Netscape Communication Company), V*Realm™ (Integrated Data Systems, Inc.), and Cosmo™ Player (Silicon Graphics, Inc.). As a helper application, the VRML browser 20 is launched by the web browser into its own window when the browser detects a VRML document being downloaded. An example of a commercially available helper application is Community Place® (Sony Corporation).

As with a web browser, the VRML browser 20 is a client that serves a single user in a three dimensional virtual reality world, and thus, the terms "client" and "VRML browser 20" should be considered interchangeable for purposes of the present disclosure. The server is a computer that is connected to the Internet, or an intranet, and that coordinates communication among one or more avatars operating on various clients, that is, VRML browsers. When the VRML browser 20 requests a VRML document located on a server, the server sends the requested VRML document to the VRML browser 20 for rendering. At the VRML browser 20, one or more rendering engines process the VRML document and display a three dimensional virtual world (or a scene of the world) on the screen display device 28. Once the VRML browser renders the virtual world, the browser allows the user to interact in the virtual world. The user may navigate in the world by walking or other means, and the user may interact with objects in the world as intended by the world author. In particular, the user may click on an object, signaling programming in the world that the user has activated that object. The browser may also be able to track the position in the world where the user is currently positioned using a proximity detector. Within a VRML world, a person's persona may be represented by an avatar which is controlled by the user. The user, thus, controls his/her navigation within a virtual world or between worlds via his/her avatar. In addition to providing a visual rendering of the graphics comprising a three dimensional virtual reality world, a VRML browser 20 may also play audio files, MPEG movies, etc., via plug-in or helper applications associated with the VRML browser 20, as well known in the art.

In operation, the computer system 16 can display three dimensional virtual environments on the screen display device 28 utilizing the VRML browser 20. The user may interact in a virtual environment by providing user input, via the input device 26, which moves the user through the virtual environment. In this sense, the user may actually be moving his/her point of view or perspective through the virtual environment. Alternatively, the user may be represented in the virtual environment by an avatar which is a representation of the user in a virtual environment which may be viewable by the user or other users in a virtual environment, as described above in the Background section. The user may then move the avatar about the virtual environment and interact with objects in a virtual environment or with other users in a virtual environment.

A vehicle mechanism 18 in accordance with the present invention is preferably configured as a software module of the VRML browser 20 that implements the present invention. The vehicle mechanism 18 can be embodied as a method, apparatus, or computer program product. Accordingly, the vehicle mechanism 18 may take the form of an entirely hardware embodiment, an entirely software embodiment, or an embodiment combining both software and hardware aspects. Furthermore, the vehicle mechanism 18 may take the form of a computer program product on a computer-readable storage medium having computer-readable program code embodied in the medium. Any suitable computer-readable medium for a use by or in connection with a computer system may include an electronic, magnetic, optical, or other physical device or means that can contain or store computer program code for use by or in connection with a computer-related system or method.

Accordingly, the present invention as implemented by the vehicle mechanism 18 provides for the navigation of a user in a virtual reality environment from a first location to a second location in a transportation vehicle while providing the user with customized information. The transportation vehicle may transport the user between two points within the same world (i.e., intra-world), or between two points in separate but connected worlds (i.e., inter-world). The transportation vehicle is preferably modeled after real-life vehicles such as an automobile, taxi, bus, subway, trolley, or other suitable type of transportation vehicle that would provide the user with a virtual experience that is closely analogous to reality. The virtual experience includes displaying advertising placards inside the transportation vehicle, displaying billboards outside the transportation vehicle so as to be viewable by the user, customized scenery outside the transportation vehicle, playing audio information, etc. As in the real world, this information may comprise advertising means for generating revenue for the author or provider of the three dimensional virtual environment. As will be appreciated by those skilled in the art, the customized information provided to the user can comprise information of general knowledge, public service announcements, interactive games, or other forms of information suitable for a two or three dimensional virtual environment. Information can be customized for the user based upon user preferences, based on preferences provided in a browser cookie, based on the user's bookmarks, or based on queries made to the user as well known in the art.

Figure 3A:
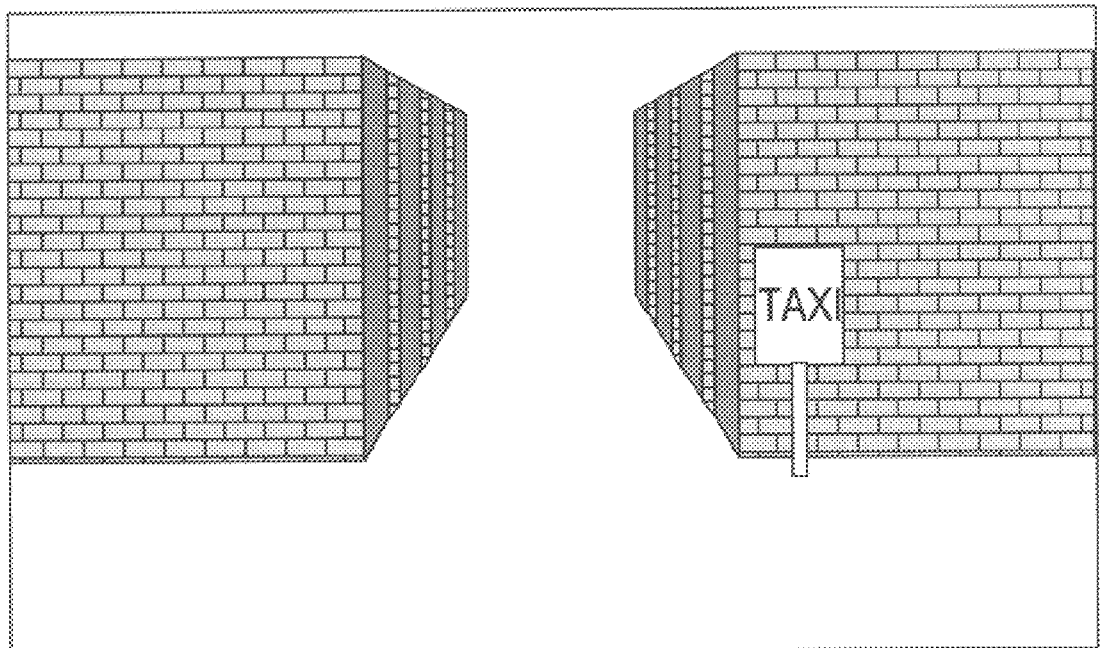
FIGS. 3A–3D are screen captures illustrating an example of a virtual transportation experience as provided by the present invention.
Figure 3B:
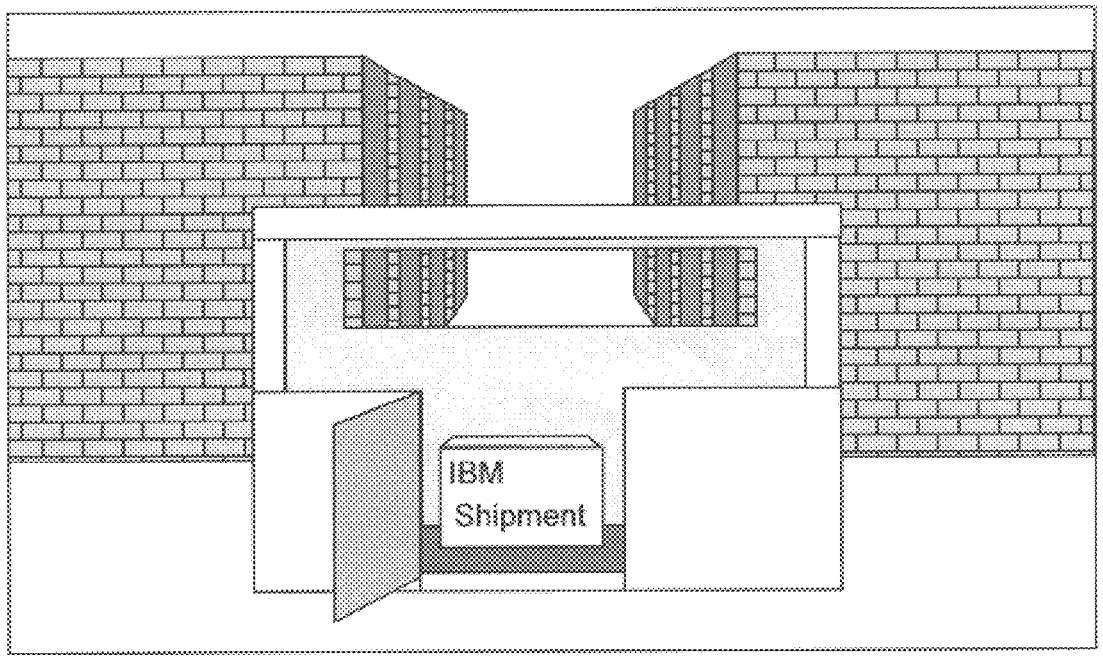
Figure 3C:
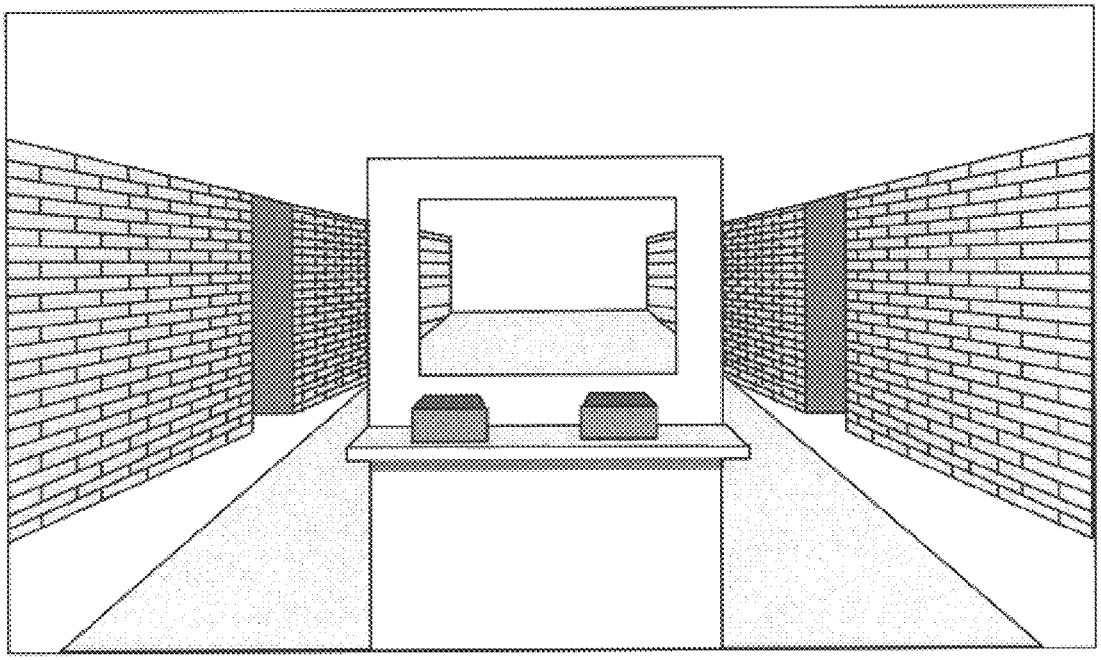
Figure 3D:
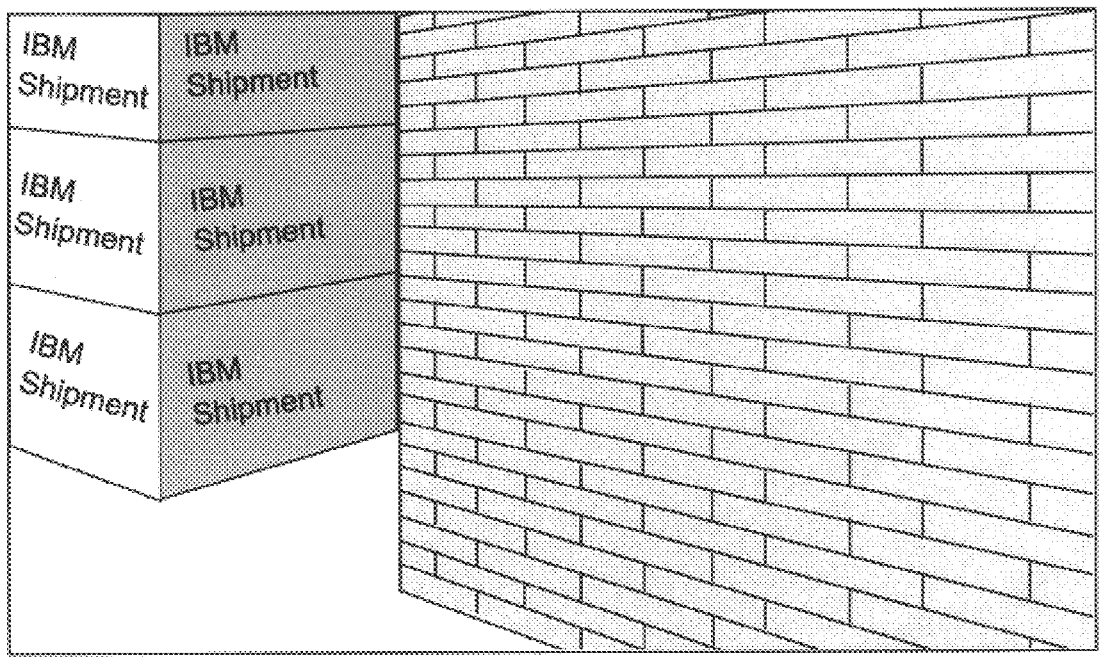

As an example, FIGS. 3A–3D are screen captures illustrating an example of a virtual transportation experience via taxi as may be provided by the vehicle mechanism 18 in accordance with the present invention. In FIG. 3A, a user visualizes a taxi signpost. By pressing the taxi signpost, a taxi is summoned, as illustrated in FIG. 3B. Particularly, in FIG. 3B a user visualizes a taxi with its door open, awaiting the user to enter. Once the user navigates inside the taxi, the user visualizes the inside of the taxi as would a passenger in a real taxi, as illustrated in FIG. 3C. Inside the taxi, the user may be provided with destination selector buttons (two of which are shown) for selecting a next location either in the current world or in another world. During the trip to the selected location, the user may be provided with information in any number of ways, as discussed above, such as descriptive advertising on the surface of a building, as illustrated in FIG. 3D. At the selected destination, the user is notified of his/her arrival and may exit the taxi into a scene of the destination.

An advantage of the transportation scheme of the present invention is that it can occupy the attention of the user while the user is navigating to another location within a world that is a large distance away (as distances are measured in the virtual world) or while the user awaits a new world to download. In the case of the latter, where the user is awaiting the download of a new world, the transportation vehicle may be an intermediate world that provides value-added content to the user while the user awaits the new world to download.

III. Operation

The present invention will now be described with reference to FIGS. 4 and 6 which are flowcharts of the operation of the vehicle mechanism 16 in accordance with a first embodiment of the present invention and a second embodiment of the present invention, respectively. The first embodiment of the present invention, as illustrated in FIG. 4, describes the operation of the vehicle mechanism 18 when providing intra-world transportation. The second embodiment of the present invention, as illustrated in FIG. 6, describes the operation of the vehicle mechanism 18 when providing inter-world transportation.

In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

With reference to FIG. 4, a request is received indicating that the user desires transportation to another location in the world, as indicated by block 40. The request by the user may be generated in any number of ways. For example, the user's presence may be detected within a specified area within the world by a proximity sensor. Associated with this point in the world is another location within the world to which the user may be transported. Alternatively, the user may press a button in order to signal a request for transportation to another location within the world. At block 42, a transportation vehicle is provided and the user navigates into the transportation vehicle. If the user has not yet selected a destination location, the user may be provided with the option of selecting a destination location from two or more options provided to the user once inside the transportation vehicle. As previously mentioned, the transportation vehicle is preferably a metaphor for a real-life vehicle used in transportation, such as an automobile, taxi, bus, or subway. Once the user is inside the transportation vehicle, the view displayed to the user should be that of someone sitting inside such a vehicle.

The transportation vehicle in this embodiment may be a sub-part of the virtual world. The transportation vehicle provides the user with an informative experience using customized information that is displayed or played to the user while the user is being transported to the new location, as reflected by block 44. The possibilities of the informative experience are only limited by the imagination and discretion of the world author. Examples of possible experiences include scenery matching the preference of the user, such as an ocean-side view that includes billboards and airplane trailers which convey information that is likewise customized to the user for advertising or other purposes. Another example includes playing a video and/or audio segment that is customized to the user for the same purposes. Yet another example includes the likeness of a visually identifiable store such as a fast-food or clothing chain. Moreover, it is important to note that any of the means described for conveying information to the user may comprise a hyperlink. For example, if the customized scenery includes a pizza store, the user may click on a hyperlink comprising the store and be provided with a menu from which the user can order a pizza for takeout or delivery. At block 46, once the informative experience is complete, the transportation vehicle arrives at the new location in the world and the user exits the vehicle. As the user exits the vehicle, the user is at the new location. It should be noted that the customized information can be provided to the user for a variable period of time that is dependent upon the amount of time it takes to prepare the second location for presentation to the user. Alternatively, the customized information can be provided to the user for a predetermined period of time. In either case, there may be a minimum period of time for conveying a discrete amount of information to the user.

Figure 5:
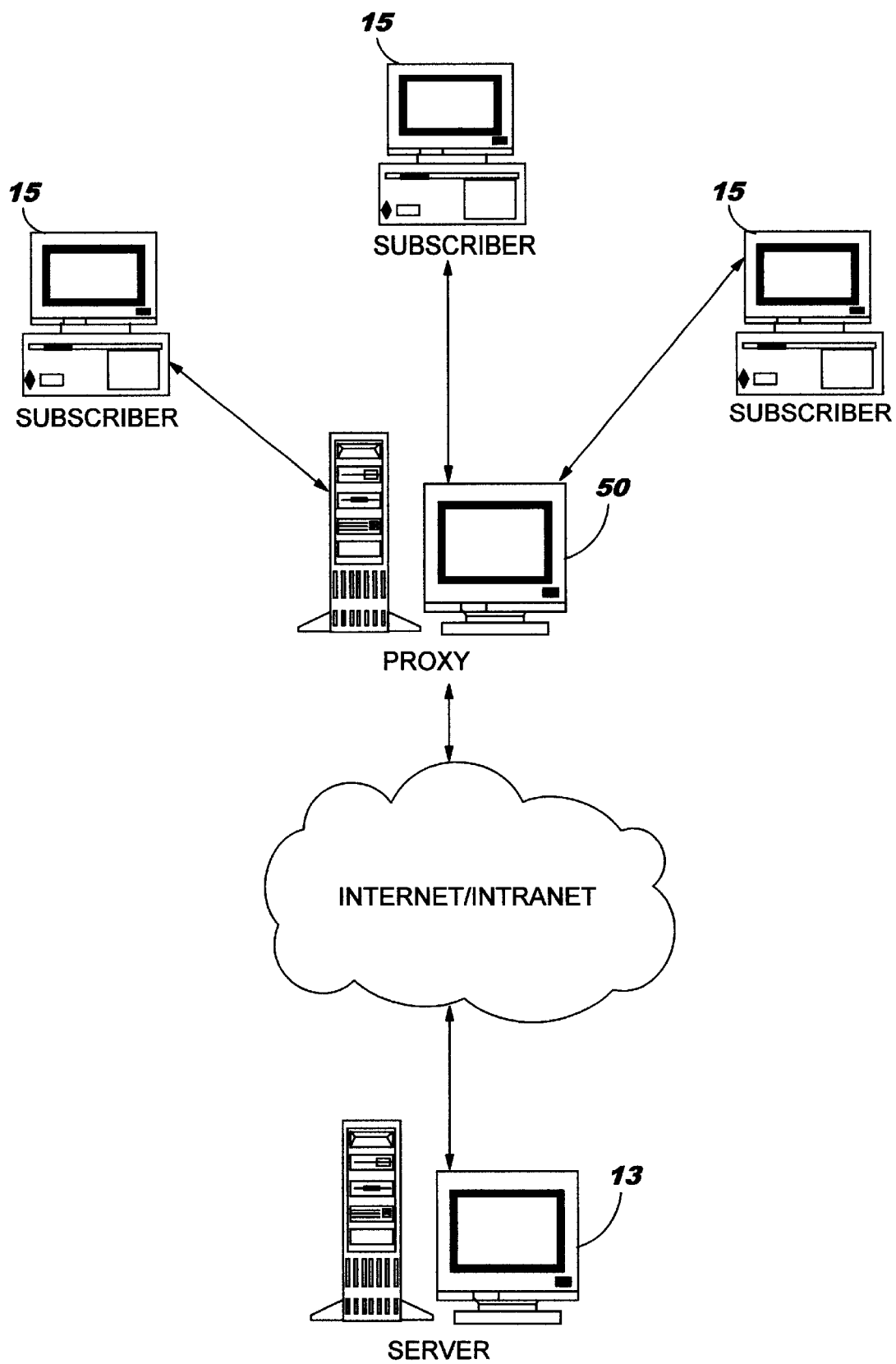
FIG. 5 is a schematic diagram illustrating an example of the interconnections comprising the Internet or an intranet wherein a proxy caches web documents.

For purposes of describing the second embodiment of the present invention which provides inter-world transportation, reference is made to FIG. 5 wherein the client server paradigm for the Internet or an intranet is illustrated. For purposes of inter-world transportation, a web proxy 50 is utilized in the second embodiment to cache an intermediate world that comprises the transportation vehicle, in accordance with the present invention. Thus, the intermediate world can be quickly downloaded to the client 15 for viewing while a new world is being downloaded from a server 13 (FIG. 5). While the proxy 50 has been illustrated as a separate computer, as will be appreciated by those of skill in the art, a proxy 50 may be established locally in a multitasking environment for further processing of client requests.

With reference to FIG. 6, a request is received indicating that the user desires transportation to another world, as indicated by block 60. As with the previous embodiment, this may be achieved by detecting the user's presence via a proximity sensor, or by the user pressing a button. In accordance with hypertext transfer protocol (HTTP), which is a communication protocol used for communication between clients and servers, a request to load the next world is issued by the VRML browser 20. The proxy 50 (FIG. 5), which is located between the user and the server where the new world resides, intercepts the request and returns an intermediate world comprising a transportation vehicle with customized information to the VRML browser 20 (block 62). By caching the intermediate world at the proxy 50, the VRML browser 20 is essentially immediately provided with the intermediate world for presentation to the user via screen display device 28. The speed at which the VRML browser 20 presents the user with the intermediate world can be enhanced by programming the current virtual world to download the intermediate world when the initial world loads.

For instance, the intermediate world can be downloaded with the initial world and tagged as the intermediate world. When a virtual world is downloaded to a browser, each node is added to the scene graph. A tree is an organized collection of displayed three dimensional nodes. Each node displays an object or set of objects. Through the tagging operation, the browser could separate and construct two scene graphs, one for the initial world and one for the intermediate world. When the user requests transportation, the initial world scene is replaced by the intermediate world in a substantially instantaneous change of the user's view. The initial viewpoint node defined in the transportation world defines the user's initial view in the transportation.

Once the user enters the intermediate world, the informative experience begins with presentation of customized information as reflected by block 64. The intermediate world provides an informative experience, as described hereinbefore, for a specified time which is long enough for the proxy 50 to retrieve the next world. As the proxy 50 completes downloading the new world, or at least nears completion, the proxy 50 and VRML browser 20 may be configured so that the proxy provides a signal to the VRML browser 20 so that the intermediate world may begin termination.

At block 66, the informative experience of the intermediate world ends after a period of time and the transportation vehicle stops so that the user can exit the transportation vehicle. The period of time that the customized information is provided to the user can be predetermined period of time, or can be a variable time period that is based upon the amount of time it takes to download and prepare the new virtual world for presentation to the user. As the user proceeds to exit the transportation vehicle via a door or some other metaphor of an exit, the intermediate world detects the exit in progress and issues a new HTTP request for the next world. Upon receiving this request, the proxy 50 sends the new world that has been locally cached at the proxy 50 to the VRML browser 20 so that the user may enter into the new world. Alternatively, the new world could be downloaded to the browser during the transportation in the intermediate world so that the new world was available immediately on exit of the intermediate world.

It is noted that the concept of an intermediate document (i.e., an intermediate world as described herein) is also applicable to HTML. In this case, as a user clicks on a hyperlink of an HTML web page to download a first web page, a proxy intercepts the HTTP request for the first web page and returns an intermediate web page. The intermediate web page may include a graphics notice indicating to the user that the requested web page is being retrieved, and provide customized information such as advertisements, news, and a list of recently retrieved URL's, including the first web page. If the user clicks on a hyperlink in the intermediate web page to download a second web page, the second web page is delivered to the user's browser, if available. If the second web page is not available for immediate delivery, the second web page is retrieved and the list of recently retrieved URL's is updated, if necessary, to include the second web page. Once either of the first or second web pages is downloaded, the user can view that web page by clicking on it from the intermediate web page. As with the intermediate virtual world paradigm, the user is provided with relevant and entertaining information that may prevent the frustration of waiting for web pages to download.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for transporting a representation of a user of a client in a virtual reality environment provided by a server from a first location to a second location, comprising the steps of:

providing a transportation vehicle from the server to the client that receives the representation of the user at the first location;

receiving, at the server, a destination signal from the client which indicates the second location as a destination;

transporting the representation of the user in the transportation vehicle through the virtual reality environment to the second location independent of user control while the second location is provided to the client; and providing customized information to the client when the representation of the user is in the transportation vehicle.

2. The method of claim 1, wherein said step of transporting the representation of the user includes transporting the representation of the user from the first location in a first virtual reality world and the second location in a second virtual reality world wherein at least one of the first virtual reality world and the second virtual reality world is received by the client from the server.

3. The method of claim 1, wherein said step of transporting the representation of the user includes transporting the representation of the user from the first location in a first virtual reality world to the second location in the first virtual reality world.

4. The method of claim 1, wherein said step of providing customized information includes providing dynamic visual scenery from the server to the client.

5. The method of claim 1, wherein said step of providing customized information includes providing an audio message from the server to the client.

6. The method of claim 1, wherein said step of providing customized information includes providing static visual graphics.

7. The method of claim 1, wherein said step of providing customized information includes providing video images from the server to the client.

8. The method of claim 1, wherein said step of providing customized information includes providing information that is selected based upon user preferences.

9. The method of claim 1, wherein said step of providing customized information includes providing customized information for a period of time.

10. The method of claim 9, wherein the period of time is predetermined.

11. The method of claim 9, wherein the period of time is dependent upon when the second location is available to the client.

12. The method of claim 2, wherein said step of providing a transportation vehicle includes receiving, at the client, an intermediate world from the server comprising the transportation vehicle.

13. The method of claim 12, wherein said step of receiving, at the client, the intermediate world includes downloading the intermediate world from a proxy.

14. An apparatus for transporting a representation of a user of a client in a virtual reality environment from a first location to a second location, comprising:

means for providing a transportation vehicle that receives the representation of a user of the client at the first location;

means for receiving, at the server, a destination signal from the client which indicates the second location as a destination;

means for transporting the representation of the user in the transportation vehicle through the virtual environment to the second location independent of user control while the second location is provided to the client; and means for providing customized information to the client when the representation of the user is in the transportation vehicle.

15. The apparatus of claim 14, wherein said means for transporting the representation of the user include means for transporting the representation of the user from the first location in a first virtual reality world and the second location in a second virtual reality world wherein at least one of the first virtual reality world and the second virtual reality world are provided to the client by the server.

16. The apparatus of claim 14, wherein said means for transporting the representation of the user include means for transporting the representation of the user from the first location in a first virtual reality world to the second location in the first virtual reality world.

17. The apparatus of claim 14, wherein the customized information includes dynamic visual scenery.

18. The apparatus of claim 14, wherein the customized information includes an audio message.

19. The apparatus of claim 14, wherein the customized information includes static visual graphics.

20. The apparatus of claim 14, wherein the customized information includes video images.

21. The apparatus of claim 14, wherein the representation of the user is an avatar.

22. The apparatus of claim 14, wherein said means for providing customized information includes means for providing information that is selected based upon user preferences.

23. The apparatus of claim 14, wherein said means for providing customized information includes means for providing customized information for a period of time.

24. The apparatus of claim 23, wherein the period of time is predetermined.

25. The apparatus of claim 23, wherein the period of time is dependent upon when the second location is available to the client.

26. The apparatus of claim 14, wherein said means for providing a transportation vehicle includes means for downloading from the server to the client an intermediate world comprising the transportation vehicle.

27. The apparatus of claim 26, wherein said means for downloading from the server to the client the intermediate world includes means for downloading the intermediate world from a proxy.

28. A computer program product for transporting a representation of a user of a client in a virtual reality environment provided by a server from a first location to a second location, the computer program product comprising:

a computer-readable storage medium having computer-readable program code means embodied in said medium, said computer-readable program code means comprising:

computer readable program code means for providing to the client a transportation vehicle that receives the representation of the user at the first location;

computer readable program code means for receiving, at the server a destination signal from the client which indicates the second location as a destination;

computer readable program code means for transporting the representation of the user in the transportation vehicle through the virtual environment to the second location independent of user control while the second location is provided to the user; and computer readable program code means for providing customized information to the client while the representation of the user is in the transportation vehicle.

29. The computer program product of claim 28, wherein said computer readable program code means for transporting the representation of the user include computer readable program code means for transporting the representation of the user from the first location in a first virtual reality world and the second location in a second virtual reality world wherein at least one of the first virtual reality world and the second virtual reality world are provided to the client by the server.

30. The computer program product of claim 28, wherein said computer readable program code means for transporting the representation of the user include computer readable program code means for transporting the representation of the user from the first location in a first virtual reality world to the second location in the first virtual reality world.

31. The computer program product of claim 28, wherein the customized information includes dynamic visual scenery.

32. The computer program product of claim 28, wherein the customized information includes an audio message.

33. The computer program product of claim 28, wherein the customized information includes static visual graphics.

34. The computer program product of claim 28, wherein the customized information includes video images.

35. The computer program product of claim 28, wherein the representation of the user is an avatar.

36. The computer program product of claim 28, wherein said computer readable program code means for providing customized information includes computer readable program code means for providing information that is selected based upon user preferences.

37. The computer program product of claim 28, wherein said computer readable program code means for providing customized information includes computer readable program code means for providing customized information for a period of time.

38. The computer program product of claim 37, wherein the period of time is predetermined.

39. The computer program product of claim 37, wherein the period of time is dependent upon when the second location is available to the client.

40. The computer program product of claim 28, wherein said computer readable program code means for providing a transportation vehicle includes computer readable program code means for downloading from the server to the client an intermediate world comprising the transportation vehicle.

41. The computer program product of claim 38, wherein said computer readable program code means for downloading from the server to the client the intermediate world includes computer readable program code means for downloading the intermediate world from a proxy.

* * * * *

UNITED STATES PATENT AND TRADEMARK OFFICE
CERTIFICATE OF CORRECTION

PATENT NO.      : 6,271,843 B1
DATED           : August 7, 2001
INVENTOR(S)     : David Bruce Lection et al.

It is certified that error appears in the above-identified patent and that said Letters Patent is hereby corrected as shown below:

<u>Title page,</u>
Item [56], References Cited, U.S. PATENT DOCUMENTS, insert the following:
-- Robertson     5,608,850     3/1997 --

Signed and Sealed this

Second Day of March, 2004

JON W. DUDAS
*Acting Director of the United States Patent and Trademark Office*